United States Patent
Glowzewski et al.

[15] 3,665,493
[45] May 23, 1972

[54] ADAPTIVE NUMERICAL CONTROL SYSTEM FOR A MACHINE TOOL

[72] Inventors: Thomas L. Glowzewski, Warren; Hymie Cutler, Detroit, both of Mich.

[73] Assignee: The Bendix Corporation

[22] Filed: Mar. 30, 1970

[21] Appl. No.: 23,698

[52] U.S. Cl..........................235/151.11, 318/571, 318/561, 318/566, 235/150.1, 90/13 C
[51] Int. Cl. .......................................................G05b 13/02
[58] Field of Search...............................318/39; 235/151.11

[56] References Cited

UNITED STATES PATENTS 3,548,172  12/1970  Centner et al. ....................235/151.11
3,479,574  11/1969  Kosem .........................235/151.11 X Primary Examiner—Eugene G. Botz
Attorney—William F. Thornton, Barnard, McGlynn & Reising and Plante, Hartz, Smith and Thompson

[57] ABSTRACT

While the path of a milling machine cutter with respect to a workpiece is controlled from prerecorded information by a conventional numerical control system, the rate of feed of the cutter along its path and the rate of rotation of the cutter are controlled by an adaptive system. The system forms a servo loop about the actual cutting operation by sensing the torque and vibration of the cutter. Maximum and minimum limits of torque, vibration, spindle speed and feed rate, as well as variables which may be derived from these factors, are preset into the system. The adaptive control acts to optimize spindle speed and feed rate without violating any of these restraints.

15 Claims, 9 Drawing Figures

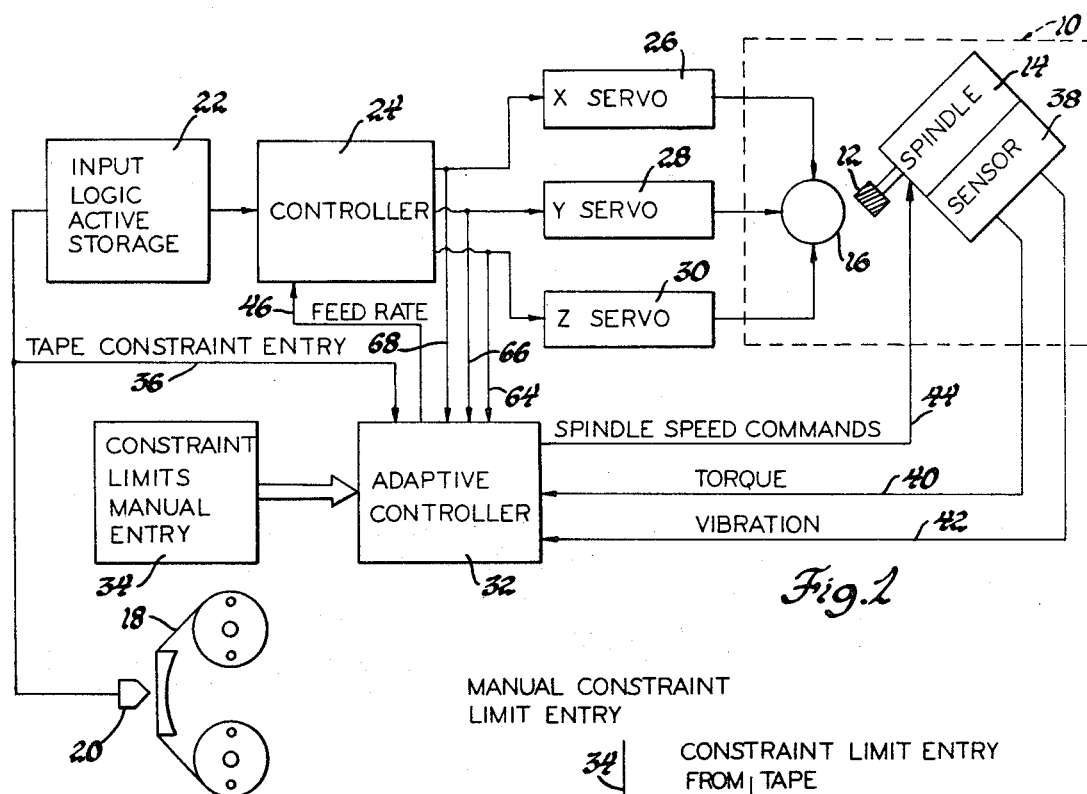
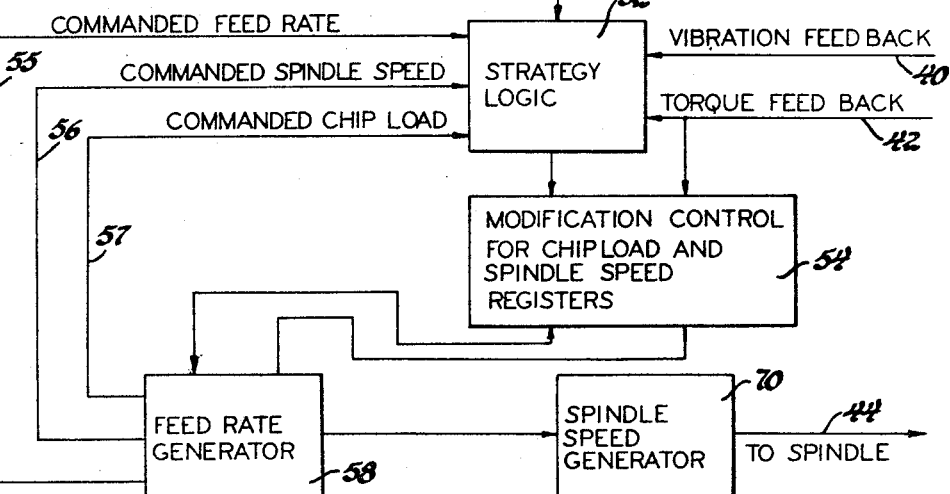
Fig. 2
INVENTORS
Thomas L. Glowzewski &
BY Hymie Cutler
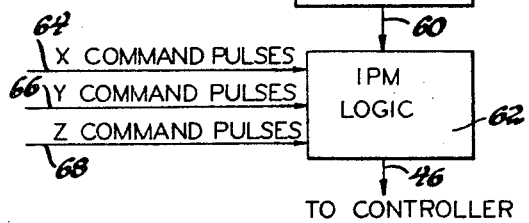
ATTORNEYS

ADAPTIVE NUMERICAL CONTROL SYSTEM FOR A MACHINE TOOL

This invention relates to adaptive systems for optimizing the performance of numerically controlled machine tools.

Systems for controlling the paths of motion of machine tool cutters with respect to workpieces in accordance with prerecorded programs have undergone intensive development and gained widespread use in recent years. Such systems relieve the machine operator of the necessity of continually guiding the cutter and, on many jobs, machines equipped with these numerical control systems produce parts of higher uniformity, at lower cost, than equivalent manually controlled machines. In addition to the path information, the prerecorded control programs for such machines often include information relating to the desired rate of motion of the cutter along its path and the rate of rotation of the cutter when a milling machine is controlled. These feed and speed values are predetermined by the programmer based on assumptions which he makes about the material being cut, the sharpness of the cutter, the condition of the machine and similar variables. By necessity the programmer must be conservative in his estimates of these factors. The machine then operates at the rates determined by this programmed information, without any deviations based on the actual cutting operation.

The operation of the machine in this manner may, under certain circumstances, be substantially less efficient, in terms of various criteria such as the speed of the cutting operation, than could be the operation of the machine under the control of a skilled machinist who could sense the performance of the machine and modify such factors as the feed rate or cutter speeds to optimize the operation. For example, in defining the feed rate the programmer must assume that the material being cut is the hardest material with which the program is likely to be used. When the program is used with a softer material, the feed rates might be increased substantially over the programmed values without impairing the machine performance. Conversely, a workpiece may include a hardened section that exceeds the hardness limits which the programmer assumed causing rapid tool degridation.

Alternatively, in many systems manual overrides for feedrate spindle speed have been provided so that an operator may observe the progress of the cutting operation and intervene to modify the programmed magnitudes of these quantities in order to optimize the machining operation.

In order to minimize this need for operator intervention it has previously been proposed to provide control systems for machine tools which sense factors related to the actual cutting operation and modify the programmed feed and spindle speed in an adaptive and optimizing manner.

The present invention relates to a system for controlling the cutter of a machine tool wherein the cutter path is governed by a conventional numerical control system and the cutter feeds and speeds are completely under control of an adaptive loop which senses the torque exerted by a cutter and the vibration of the cutter and controls the feed and speed within preset constraint limits to optimize the operation. The operation may be optimized in accordance with one of several dependent criteria. For example, the metal removal rate may be maximized but only at a sacrifice of tool life. Similarly, if the force at which the cutter may impact the workpiece is increased, the speed of the operation improves but tool life is decreased. Based on factors such as these, in a preferred embodiment of the invention maximum allowable values of such variables as torque, vibration, chip-load, spindle speed, feed rate, and impact chip-load are set into the control as are the minimum allowable chip-loads and spindle speeds. These factors may either be manually entered into the system at the beginning of an operation or may be encoded on the information source with a numerical control system. Starting with minimum cutter speed and chip-load, both these variables are regularly increased by predetermined percentages until the feedback signals indicate that one of the preset restraints has been violated. Then, depending upon which constraint has been violated, either the spindle speed, the chip-load or both are decreased until the violation is eliminated. Both variables are then again modified and this strategy is continued. As will be subsequently illustrated, this proves to maximize the values of both of the variables.

The preferred embodiment, which will be subsequently disclosed in detail, derives a feedrate control signal by multiplying feed per revolution (chip-load) by the spindle speed in revolutions per minute. A digital differential analyzer (DDA) technique is used to achieve the multiplication. Separate registers are provided for storing the chip-load and the spindle speed. The contents of the chip-load register is repeatedly added to the contents of a second register and the overflows from that second register, which occur at a rate proportional to the contents of the chip-load register, are used as commands to control the addition of the contents of the spindle speed register into a fourth register. The overflows from this fourth register therefore occur at a frequency proportional to both the chip-load register contents number and the spindle speed register contents. This feedrate signal has a frequency proportional to the desired resultant feedrate produced by the individual components represented by the machine control axes. To control the rates of pulse generation of the interpolators associated with each machine control axis, the pulse outputs of these interpolators are each provided to circuits which generate numbers proportional to the square of the frequency of their inpulse trains. These numbers are then summed together and compared with the output of a similar number produced by a squaring circuit which has the feedrate signal as its input. The comparison circuit feeds back to the interpolators and controls their rates of operation so as to maintain an equality between the square of the feedrate signal and the sums of the squares of the interpolator output signals. A spindle speed control signal is also developed directly from the contents of the spindle speed register.

The adaptive system achieves control over spindle speed and feedrate by adjusting the contents of the chip-load and spindle speed registers. When the machine is initially started up and the tool is out of contact with the workpiece, the system senses this condition because of the low torque and vibration feedback and inserts numbers in spindle speed registers which cause a relatively fast feedrate determined by the impact chip-load minimum and spindle speed constraint settings. As soon as the cutter impacts the work, the contents of the chip-load and spindle speed registers are modified to the minimum chip-load and spindle speed settings, initiating the minimum feedrate and the spindle speed. At short intervals thereafter the contents of the chip-load and spindle speed registers are incremented. The spindle speed register content is always incremented by a fixed percentage of its previous content and the chip-load register is initially incremented in the same manner.

This percentage change technique generates a small increment of change when the values contained in the registers are low and provides large changes for larger register contents. Two advantages accrued to this technique: First, it guards against overshoot of the set limit values, and secondly it guards the cutting operation from too abrupt changes of operating values.

At the same time as the chip-load register is incremented, a register which initially contains the torque feedback signal is also incremented. The setting of this register is continually compared with the maximum torque setting register to prevent the further incrementing of the chip-load register at such time as maximum torque, as linearly interpolated by this circuit, is exceeded. This proportional control technique allows the amount of modification of the chip-load register to be calculated so as to closely achieve the desired set limit value.

This process continues until maximum settings of chip-load and spindle speed within the constraint limits are achieved. If a constraint limit is reached, one or both of the registers is decremented until the violation is eliminated. In this manner the system continually modifies the spindle speed and the feedrate under control of the preset constraints and the actual torque and vibration feedback signals in such a manner as to optimize the factor used in the selection of the constraint limits. For example, if the machining operation encounters a hardened section of the workpiece, the resultant increase in torque will exceed the maximum preset torque constraint and cause an immediate decrement of the content of the chip-load register which will decrease the feedrate until actual torque does not exceed the preset torque. Similar adaptive tactics will be triggered by other conditions encountered in operation and will similarly operate to maximize the spindle speed and feedrate within the preset constraints.

It should be recognized that the preferred embodiment of the invention, as heretofore described, and as will be subsequently described in greater detail, only represents the preferred exemplification of the present invention and other systems quite different from the preferred embodiment could be constructed employing the present invention.

Other advantages and applications of the present invention will be made apparent by the following detailed description of a preferred embodiment of the invention. The description makes reference to the accompanying drawings which:

FIG. 1 is a schematic diagram, largely in block form, of a contouring type numerical control system for a milling machine incorporating the adaptive controller of the present invention;

FIG. 2 is a block diagram of the adaptive controller,

Figure 3:
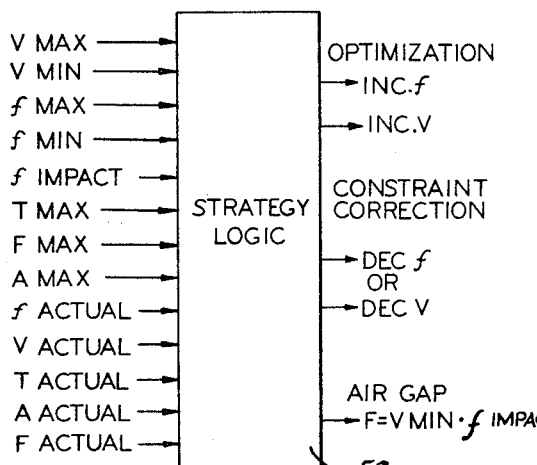
FIG. 3 is a block diagram of the strategy logic unit which forms part of the adaptive controller.

The preferred embodiment of the invention is illustrated in connection with a milling machine, indicated at 10, which includes a cutter 12 which is adapted to be rotated by a spindle 14. The milling machine 10 operates upon a workpiece 16 and the position of the workpiece with respect to the cutter 12 is adapted to be controlled along three mutually perpendicular axes.

Control over the workpiece position is achieved under the direction of numerical information retained in an appropriate storage media such as a magnetic tape 18. A reading head 20 generates electrical signals which are a function of the data contained on the tape as the tape is moved past the head, and provides these signals to an input logic and active storage sub-system 22 which modifies the data into a form suitable for use by the control system, such as making a binary-coded-decimal to binary conversion, and which stores the information in appropriate memory devices for use by other elements of the control. The information stored in the sub-system 22 is provided to a controller 24 which is operative to generate a plurality of pulse trains, one for each axis of the machine which is positionally controlled, under the control of the input data. These pulse trains contain numbers of pulses proportional to the distance through which the workpiece 16 is to be moved with respect to the cutter 12 along each axis of control. In the preferred embodiment of the invention, control is exercised over three mutually perpendicular axes, and accordingly the controller 24 provides three output pulse trains to an X axis servo 26, a Y axis servo 28 and a Z axis servo 30. The servos are operative to move the workpiece relative to the cutter through one increment of distance, such as .0001 inch, for each pulse received.

The tape 18 has previously been coded by a programmer using a computer with a plurality of command signals which cause the control to sequentially move the workpiece along an appropriate contour.

The system as heretofore described is a conventional contouring numerical control system of the type broadly disclosed in the Forrester et al. U.S. Pat. No. 3,069,608, and more specifically disclosed in Ho et al. Pat. No. 3,128,374.

The present invention adds to such a conventional contouring system apparatus which broadly controls the rate of rotation of the cutter 12, and the rate at which the controller 24 generates its output pulse trains, both in accordance with feedback signals from the machining process and preset constraint limits. These control operations are performed by an adaptive controller 32. The controller, previous to the initiation of the machine operation, receives information relating to the cutting operation from either or both a constraint limit manual entry unit 34 and tape 18 via the reading head 20 and a line 36. During the machine operation the adaptive controller 32 receives signals from sensors 38 associated with the machine. These signals comprise a torque value on line 40, and a vibration value on line 42. The adaptive controller also receives the same three signals that are provided by the controller 24 to the X, Y and Z servos 26, 28 and 30 on lines 64, 66 and 68. Based on the constraint limit values and the values of the signals provided from the sensors 38 and the controller 24, the adaptive controller 32 acts to generate spindle speed command signals which are provided to the spindle 14 via line 44 and feedrate command signals which are provided to the controller 24 via line 46. These signals, which are regularly adjusted during the machining operation, control the rate of rotation of the spindle and the rate of generation of output signals by the controller 24, and thus the rate of feed of the workpiece 16 with respect to the cutter 12. The changes are made in such a way as to optimize the feedrate and the spindle speed within the constraint limits applied to the system.

The internal organization of the adaptive controller 32 is illustrated in block form in FIG. 2. Its various sub-systems will now be described in a functional manner. Previous to the start of operation of the machine various constraint limits are fed into a constraint limit storage unit 50 from either or both of the manual entry 34 or the tape 18 via line 36. The unit 50 simply acts to store these constraint limit signals so that they are available to the system during the machine operation.

These signals are provided to a strategy logic sub-system 52. This unit also receives the vibration and torque feedback signals from the sensors 38 via lines 40 and 42. Additional inputs to the strategy logic unit are the commanded feedrate, commanded spindle speed and commanded chip-load signals received on lines 54, 56 and 57, respectively, from a feedrate generator 58 which forms one of the other sub-systems of the adaptive controller 32 and will be subsequently described in detail. Based on the constraint limits, the feedback signals and the commanded signals, the strategy logic makes a determination as to the broad strategy to be followed in modifying the spindle speed and feedrate in order to achieve optimization in the machining process. As will subsequently be described in detail, the strategy logic bases its determinations on comparisons of the constraint limits and the actual performance factors and choses a strategy which falls into one of three broad classes:

1. Air gap condition and no constraint violation. The cutter is not in contact with the workpiece and the feed and spindle speed should be adjusted to high values which will bring the cutter into contact with the work at the maximum tolerable impact force.

2. No constraint violation and no air gap. The cutter is in contact with the workpiece and the constraint limits are not being exceeded. Accordingly, both the chip-load and spindle speed signals should be increased.

3. Constraint Limit Violation. The feedback or command signals indicate that one of the preset constraint limits is being violated. Either or both of the chip-load or spindle speed signals should be decreased.

The strategy logic unit 52 exercises control over a unit 54 termed "Modification Control for Chip-Load and Spindle Speed Registers." The modification sub-system 54 exercises direct control over the feedrate generator 58 by modifying the contents of chip-load and spindle speed registers which are contained within the feedrate generator and will be subsequently described in detail. These modifications are made at short intervals termed "sample." The modification control has an input of torque feedback from line 42 and uses this feedback signal to determine the exact tactics of modification of the registers. Very broadly, the control 54 always modifies spindle speed by a fixed percentage of the contents of the spindle speed register during each sample period. Chip-load is modified by fixed percentages as long as no constraint limits are violated but as soon as the torque constraint is violated, the incrementing process is terminated.

The feedrate generator 58, which will be subsequently described in detail, contains spindle speed and chip-load registers and essentially multiplies the factors contained in these registers to form a pulse signal having a frequency proportional to the product of the two factors which constitutes the feedrate command signal. This is provided on line 60 to a sub-system 62 termed IPM (inches per minute) logic.

The frequency of the pulse signal on line 60 is proportional to the desired resultant feedrate of the cutter 12 with respect to the workpiece 16. Since that resultant motion is achieved by three component motions represented by the three axes of the machine over which control is exercised in the preferred embodiment, it is necessary to exercise servo control over the interpolators to ensure that the resultant motion commanded by three individual motion commands is at the desired level. Accordingly, the IPM logic unit 62 receives the feedrate control signal from the feedrate generator on line 60 as well as the trains of X, Y and Z command pulses, produced by the interpolator 24, on lines 64, 66 and 68. Based on these signals, the unit 62 produces a signal on line 46 which controls the rate of operation of the interpolators contained in the controller 24.

With a DDA type of interpolator (as shown in Ho et al. U.S. Pat. No. 3,128,374), this signal controls the rate of addition of the command numbers into the R. registers.

The contents of the spindle speed register 80, which is contained within the feedrate generator 58, is provided to a spindle speed generator 70, which constitutes a digital to analog converter which generates a voltage having an amplitude proportional to the spindle speed member that is provided to spindle on line 44 and acts to control its speed.

The operation of the system thus broadly described, and in particular the method of operation of the modification control 54, will now be described on a sub-system by sub-system basis.

CONSTRAINT LIMIT STORAGE

The constraint limit values, which may either be provided to the system by means of manually adjustable switches on the control panel or from the numerical control tape, constitute the following values:

1. Maximum allowable torque (T-max)
2. Maximum allowable vibration (A-max)
3. Maximum allowable chip-load ($f$-max)
4. Maximum allowable spindle speed (V-max)
5. Maximum allowable feedrate (F-max)
6. Minimum chip load ($f$-min)
7. Minimum spindle speed (V-min)
8. Impact chip-load ($f$-impact)

In the preferred embodiment of the invention these values are set into the machine in decimal form from input switches and the constraint limit storage unit 50 performs the operation of converting these decimal values to binary form for use by the machine, in accordance with conventional practice.

FIG. 3 illustrates the strategy logic unit 52, its inputs, and the classes of its outputs. In addition to the eight constraint limit inputs, the feedback inputs and the three inputs from the feedrate generator, a torque minimum signal (T min) is preset in the unit 52 when it is coupled to the machine 10 and is normally not changed.

STRATEGY LOGIC

With no constraint violations, the strategy logic unit 52 provides a pair of signals to the modification control 54 directing it to increase chip-load and increase spindle speed.

If the $f$-max (maximum chip-load) constraint limit is violated by virtue of the commanded chip-load exceeding the preset maximum and this is the only violated constraint, then signals are provided to the modification control 54 commanding the spindly speed be increased, but chip-load not increased. If V-max (maximum spindle speed) is the only violated constraint, then spindle speed is not increased but chip-load is.

With the torque constraint violation and no violation of F-min (minimum chip-load), a signal is sent to the modification control to decrease chip-load. With a violation of either vibration or feedrate and no violation of the minimum spindle speed, the unit 52 generates a signal calling for decreased spindle speed.

It should be noted that on the basis of these conditions it is possible for $f$-max to be reached and increases in spindle speed to continue to occur and conversely for V-max to be reached and increases in chip-load to continue to occur. Only a violation of maximum torque, vibration, or feedrate will prevent increases in both spindle speed and chip-load. It should also be noted that a maximum torque violation is the only condition that will cause a decrease in chip-load while only feedrate or vibration violations will cause a decrease in spindle speed.

A third class of signals is produced by the strategy logic when T-actual falls below T-min indicating that an air gap exists between the cutter and the workpiece. In this case, the settings of the chip-load and spindle speed registerss are immediately, respectively set to $f$-impact and V-min rcalling for feed at the maximum speed at which the tool is allowed to approach the work through the air.

The corrections that the control initiates upon violation of the various constraints, and the effect on the tool operation which results from this correction are summarized in the following chart:

| Violation | Correction | Effect |
|---|---|---|
| T-Max. | Decreases chip load | Limits tool deflection Minimizes tool breakage Increases tool life |
| A-Max. | Changes spindle speed | Limits tool chatter Controls surface finish Increases tool life |
| $f$-Max. | Prevents further increase in chip load | Limits feedrate for low torque or finish cuts Controls surface finish |
| $f$-Min. | Prevents further decrease in chip load | Sets minimum metal removal rate and prevents "underflow" |
| F-Max. | Decreases feedrate and spindle speed | Limits feedrates to the maximum permissible for the slide drives Improves tool life |
| V-Min. | Prevents further decrease of spindle speed | Prevents poor surface finish and protects spindle motor |
| V-Max. | Prevents further increase of spindle speed | Prevents excessive tool wear rate and work hardening |
| T-Min. | Sets feedrate to $f$-impact rates | Decreases unprogrammed air cutting time |

MODIFICATION CONTROL

Figure 4:
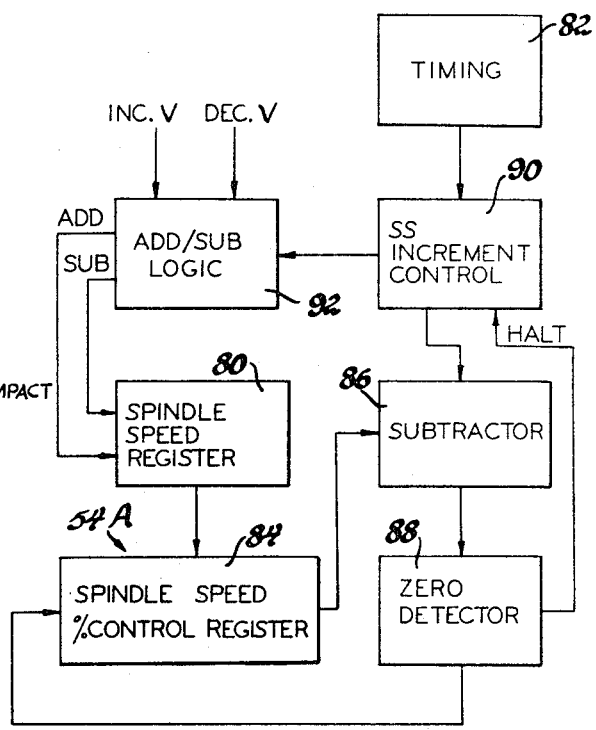
FIG. 4 is a block diagram of the spindle speed modification control which forms part of the adaptive control.
Figure 5:
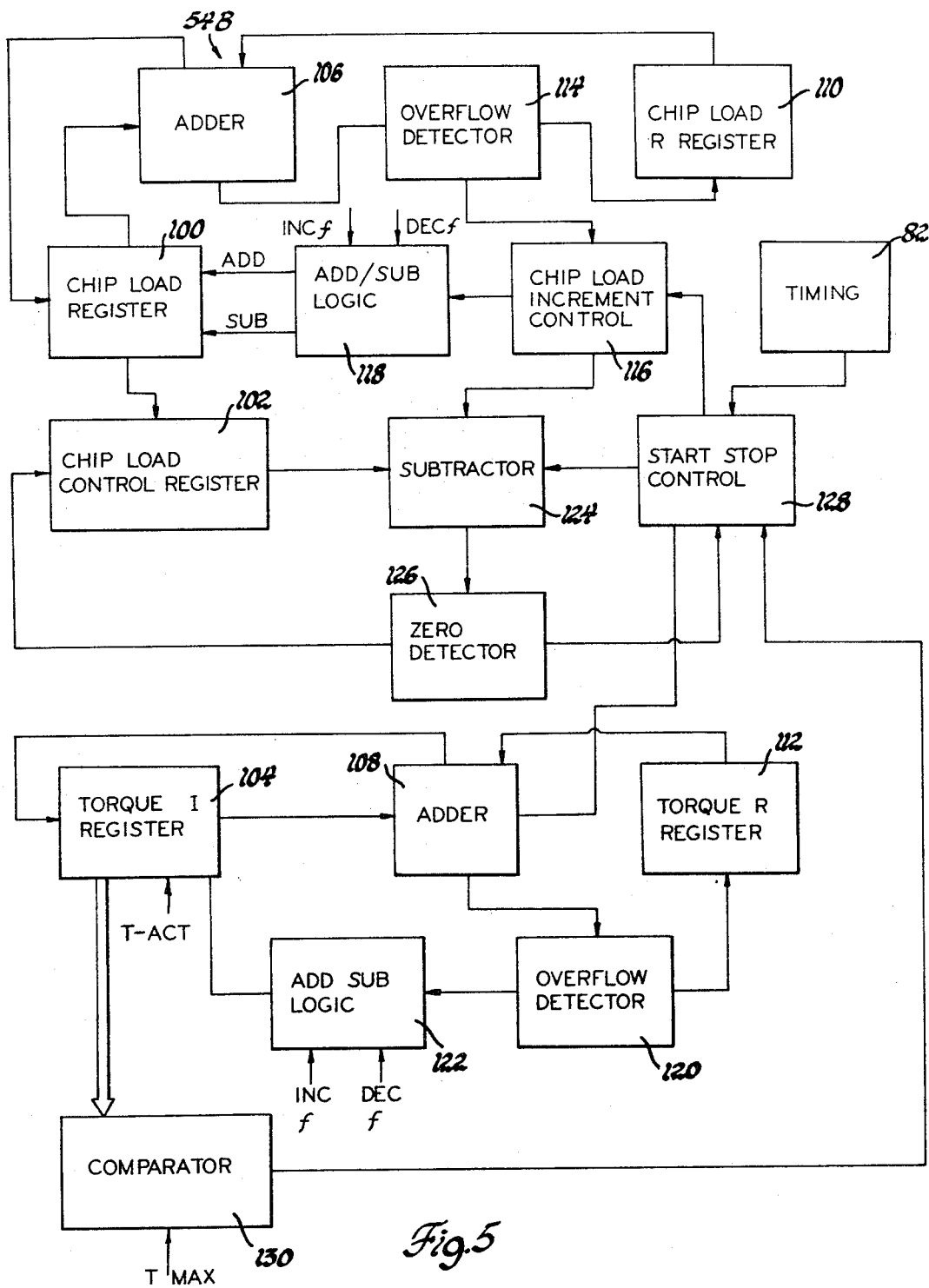
FIG. 5 is a block diagram of the chip-load modification control which forms a part of the adaptive controller.

The modification control 54 is schematically illustrated in FIGS. 4 and 5 as comprising a pair of sections: 54a, disclosed in FIG. 4, which contains the spindle speed control, and 54B, illustrated in FIG. 5, which contains the chip-load control. Both of these sections receive the output signals from the strategy logic unit 52 which are illustrated in FIG. 3, and act under control of these signals to modify the contents of the spindle speed register and the chip-load register which are both contained within the feedrate generator 58 but are illustrated in FIGS. 4 and 5 as being part of the modification control for clarity of description.

SPINDLE SPEED MODIFICATION

The spindle speed modification control 54A acts to increase or decrease the contents of a spindle speed register 80 under the control of signals from the strategy logic unit 52. The register 80 may be a magnetostrictive delay line or a flip-flop shift register. The modification of the spindle speed register occurs at regular intervals under the control of signals from a timing unit 82. In the preferred embodiment of the invention these timing signals, which define a sampling period, are generated when previous modification has been completed so that the values measured by the sensors are those caused by the new feedrates or spindle speeds, and the spindle has rotated through at least one revolution. The requirement that the spindle rotate through a complete revolution is dictated by the fact that the tool may have some run other than two cutting angles may not be perfectly uniform. Thus, it will require at least one spindle revolution to be able to measure the maximum value of torque accurately. In the preferred embodiment to this invention, this sampling period may average about 100 microseconds.

During each sampling period, the contents of the spindle speed register 80 are modified by approximately 1.6 percent. The register is a binary register of 10 bits in length. It thus can contain any number up to 1,023. The spindle speed register modification process first involves the entry of the contents of the spindle speed register 80 into a spindle speed percentage control register 84, also 10 bits in length. The percentage control register 84 is a recirculating delay line register which continuously circulates its contents through a subtractor 86 and a zero detector 88. The output of the zero detector is fed back into the percentage control register 84. In order to modify the contents of the spindle speed register by 1.6 percent, the contents of the percentage control register 84, which is initially equal to the contents of spindle speed register 80, are recirculated through the subtractor 86 and zero detector 88, and during each recirculation a binary one is subtracted from the fifth stage of the register. This is equivalent to subtracting the number 16 from the contents of the register. If the register initially contained all ones, 69 subtractions would be required to reduce the contents of the percentage control register to zero; if the initial contents are lower, fewer recirculating subtractions are required. The condition of all zeros is observed by zero detector register 88. Simultaneously with each of the subtractions from the percentage control register 84, one is either added or subtracted from the least significant stage of the spindle speed register 80, depending upon whether the spindle speed is to be increased or decreased. This is accomplished under the control of a spindle speed increment control 90 which provides a single pulse to an add/subtract logic unit 92 and at the same time provides a subtracting pulse to the subtractor 86. The logic unit 92 either adds or subtracts a pulse from the spindle speed register 80 under control of the increment or decrement signals from the strategy logic unit 52. This modification process is halted when the zero detector 88 signals that the contents of the precentage control register 84 have been fully depleted. At this point, the contents of the spindle speed register have been modified by 1.6 percent.

CHIP-LOAD MODIFICATION

Increases in the contents of the chip-load register 100 under the control of the modification unit 54B are conducted in a different and more complex manner than are modifications in the spindle speed register 80. Since the chip-load is related to torque in a generally linear manner, linear interpolations of both torque and chip-load are performed to arrive at the chip-load required for maximum torque. However, in order to avoid sudden changes in chip-load, the modification is limited at its upper end by a modification of 3.2 percent of the original contents of the chip-load register using a percentage control technique similar to that employed with the spindle speed. Thus, in normal operation, the chip-load is increased by 3.2 percent during each sampling period until maximum torque is reached. That torque will normally be reached during an increase period, and the incrementing will be terminated at that point rather than completing the full 3.2 percent increment.

When the stragegy logic 52 calls for a decrease in chip-load, the percentage control is inoperative and a proportional decrease in the chip-load occurs during the next sampling period.

During the increase and decrease in contents of the chip-load register 100, a torque register is similarly modified in a linear manner in order to determine the torque modifications in an internal manner, without dependence on the slightly delayed feedback torque signal.

At the start of a sample period, the contents of the chip-load register 100 are inserted into a chip-load percentage control register 102, and the actual torque number is loaded into the torque I register 104. All three of these units constitute recirculating shift registers.

The contents of the chip-load register 100 are regularly passed through an adder 106 as are the contents of a recirculating chip-load R register 110. The contents of the torque I register 104 pass through an adder 108 along with the contents of a recirculating torque R register 112. By means of the adder 106 the contents of the chip-load register 100 are regularly added into the chip-load R register 110. Similarly, by means of the adder 108, the contents of the torque I register 104 are regularly added to the torque R register 112.

The line which returns the output from the adder 106 to the chip-load R register 110 passes through an overflow detector 114 which detects the overflows from the most significant stage of the R register 110. Each time one of these overflows occurs, the chip-load register 100 is either incremented or decremented by a count of one. This is done by the chip-load increment control 116 which receives the output of the overflow detector 114 and provides a pulse to an add/subtract logic unit 118. This logic unit has inputs from the strategy logic 52 which indicate whether the chip-load register is to be incremented or decremented, and accordingly adds or subtracts a count of one from the chip-load register.

In a similar manner, the output of the adder 108 is passed through an overflow detector 120 before being returned to the torque R register 112. Overflows from the torque R register are thus detected and used to increment or decrement the torque I register 104 under control of an add/subtract logic unit 122 which receives the increment or decrement chip-load signals from the strategy logic unit 52. If the chip-load is to be incremented, a one is added to the torque I register 104 each time an overflow is sensed by the detector 120, and similarly ones are subtracted from the torque I register 104 upon occurrence of overflows if the chip-load register is to be decremented. Through this technique, the contents of the chip-load register 100 and the torque I register 104 are modified at rates that are proportional to their contents. This linear interpolation derives a torque value which is on the straight torque/chip-load line.

As has been noted, when chip-load is being incremented the modification which occurs in any one sample period is limited to 3.2 percent of the previous chip-load register value. This is achieved under the control of the chip-load percentage control register 102 which is continually recirculated through a subtractor 124 and a zero detector 126. Each time the chip-load increment control 116 causes a modification of the chip-load register 100, a pulse is provided to the subtractor 124 which subtracts a pulse from the sixth most significant stage of the ten bit chip-load register. Thus, after 32 subtractions, the contents of the chip-load percentage control register 102 will be decreased to zero, and this condition will be sensed by the detector 126 which will provide a signal to a start-stop control 128 terminating further modification of the chip-load register during that sample period. At the beginning of the next sample period, a pulse from the timing unit 82 to the start-stop control 128 initiates another incrementing or decrementing cycle.

The value contained in the torque I register is continually compared with the value of T-max by a comparator 130. If the contents of the torque I register 104 reach T-max during an incrementing cycle, a signal is provided by the comparator 130 to the start-stop control 128 terminating further incrementing during that time length cycle. Similarly, if the chip-load register 100 is being decremented during a sample period and T-max is reached, further decrementing is decreased.

FEEDRATE GENERATOR

Figure 6:
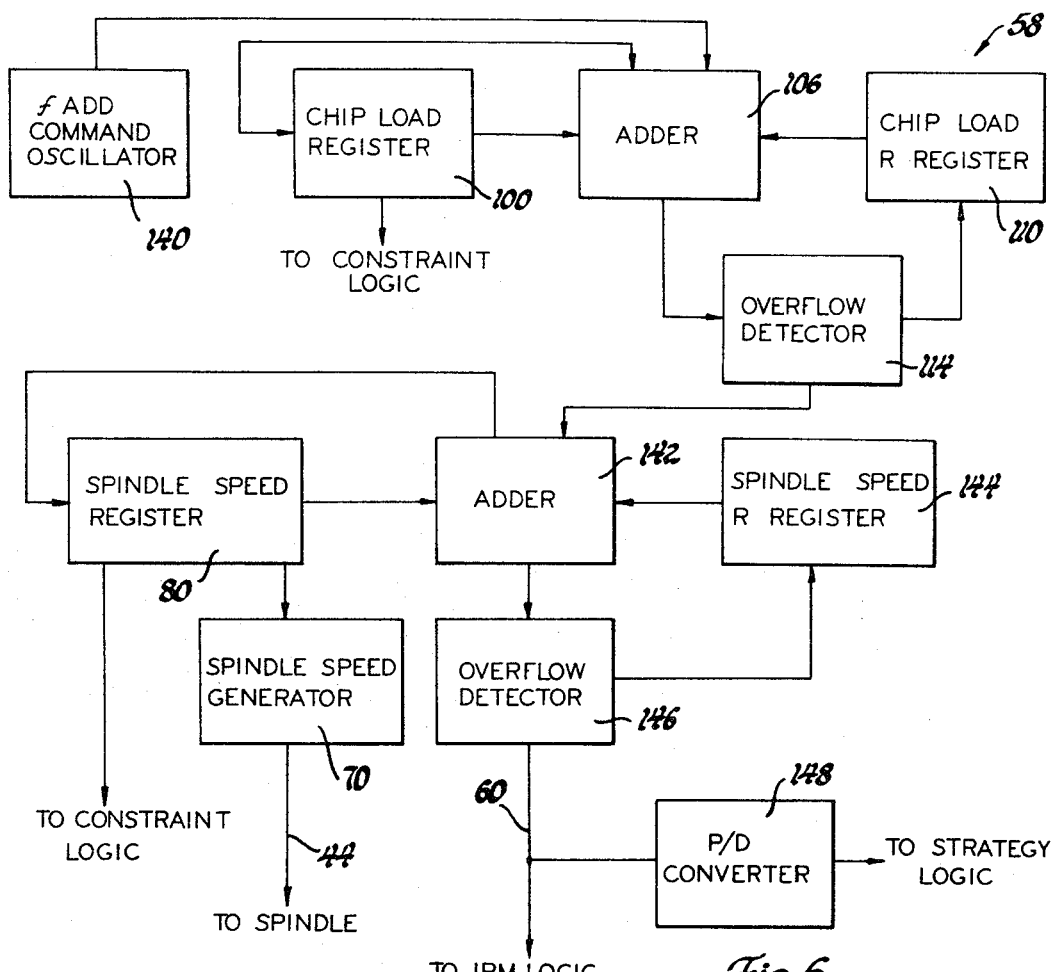
FIG. 6 is a block diagram of the feedrate generator which forms part of the adaptive controller.

Up to this point, the description has been limited to that part of the system which modifies the contents of the spindle speed register 80 and the chip-load register 100 in order to modify the spindle speed and feedrate signals provided to the numerical control system and machine in an adaptive manner. The prime function of the feedrate generator 58, which is illustrated in detailed block form in FIG. 6, is to actually generate the feedrate and spindle speed signals. Since chip-load is defined as feed per revolution, the feedrate is the product of chip-load and spindle speed. Accordingly, the feedrate generator 58 acts to multiply chip-load by spindle speed to derive a feedrate signal. This is achieved by interpolating the contents of the chip-load register in a DDA type manner so that a pulse train is obtained having a frequency proportional to the contents of the register. The pulses in this train act as add commands for the interpolation of the spindle speed register so that the overflows from the spindle speed DDA process occur at a rate proportional to the product of the contents of the chip-load register and the spindle speed register.

The chip-load register 110 and overflow detector 114 which were illustrated in FIG. 5 as forming part of the chip-load proportional control system are also illustrated in FIG. 6. A chip-load add command oscillator 140 provides pulses to the adder 106 which cause the contents of the continually recirculating chip-load register 100 to be added into the chip-load R register 110. These add commands are also used in the chip-load proportional control process of the modification control 54. The overflows from these additions are sensed by the detector 114 which provides an output pulse each time an overflow occurs. These overflows thus occur at a rate proportional to the contents of the chip-load register multiplied by the constant value represented by the output rate of the F add command oscillator 140.

This pulse train from the overflow detector 114 is provided to another adder 142 which continually receives the recirculating contents of the spindle speed register 80. Upon the receipt of each pulse from the overflow detector 114, the adder 142 adds the contents of the spindle speed register 80 into a spindle speed R register 114 which is also continually recirculating through the adder 142. The overflows of the R register 144 are sensed by a detector 146 which provides an output pulse each time an overflow occurs. Thus, the output of the overflow detector is a pulse train which is proportional to both the contents of the chip-load register 100 and the spindle speed register 80, and thus proportional to their product. This output, on line 60, is also provided to a pulse-to-digital converter 148 which provides its output to the strategy logic. This input to the strategy logic constitutes the actual feedrate signal.

Similarly, the contents of the chip-load register 100 and the spindle speed register 80 are both provided to the constraint logic. The spindle speed register contents 80 are also sent to the spindle speed generator 70 which constitutes a digital-to-analog converter which provides an appropriate control voltage to the spindle on line 44.

IPM LOGIC

The instantaneous resultant velocity of the cutter with respect to the workpiece is equal to the square root of the sum of the squares of the three component velocities along the three mutually perpendicular machine control axes. Since the frequency of the feedrate pulse train provided on line 60 is proportional to the desired resultant velocity of the cutter with respect to the workpiece, and since the actual velocities of the three controlled axes are proportional to the frequencies of the command pulse trains provided to the X, Y and Z servos 26, 28 and 30, respectively, by the controller 24, the resultant motion of the cutter will be occurring at the commanded rate when the frequency of the pulse train on line 60 is equal to the square root of the sum of the three frequencies of the trains on line 64, 66 and 68. This equality may be restated as: the square of the frequency of the pulse train on line 60 must be equal to the sum of the squares of the frequencies of the pulse trains on lines 64, 66 and 68 for the actual motion to be proceeding at the commanded rate. The IPM circuitry accepts the pulse trains on line 60, 64, 66 and 68 and provides an output signal to the controller 24 on line 46 which varies the rate of generation of the X, Y and Z command pulse trains so as to maintain the equality.

Figure 7:
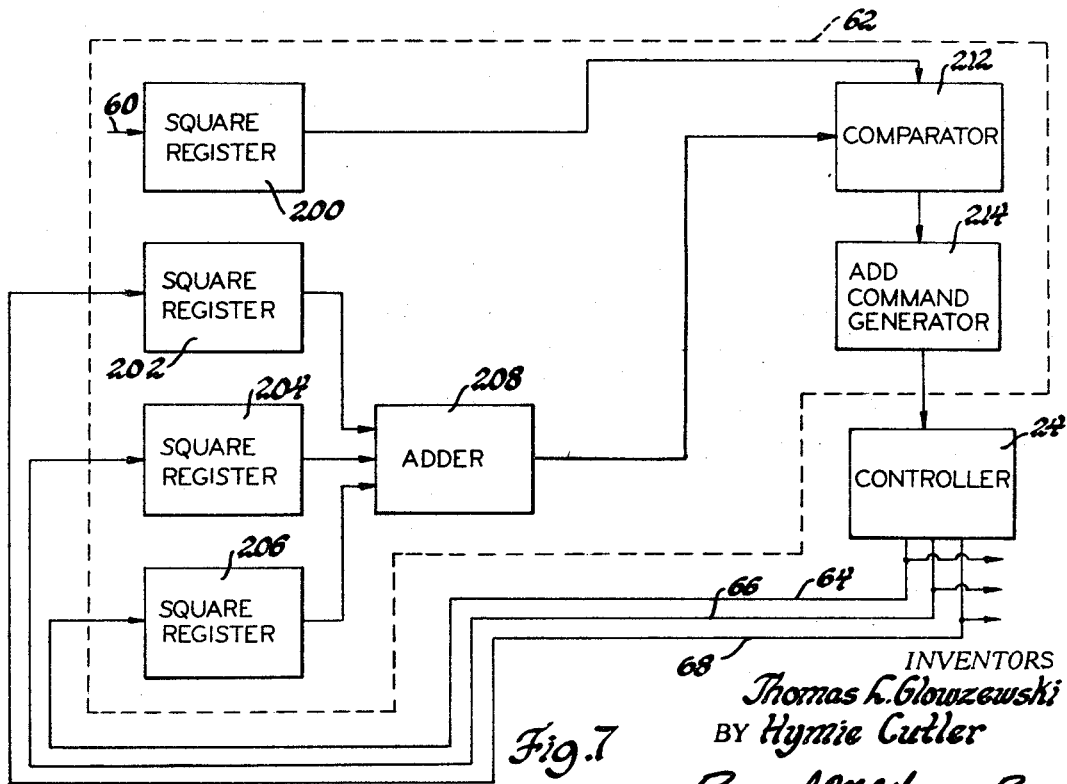
FIG. 7 is a block diagram of the IPM logic which forms a part of the adaptive controller.

The broad block organization of the IPM logic 62 is illustrated in FIG. 7. The pulse train on line 60 is provided to a square register 200 which generates a series of binary numbers the sum of which is equal to the square of the number of pulses received. The nature of this device will be subsequently described with the aid of FIG. 8. Similarly, the three command pulse trains for the X, Y and Z axes, on line 64, 66 and 68, respectively, are provided to three additional square registers 202, 204 and 206. The numbers generated by the registers 202, 204 and 206 are simultaneously provided to an adder 208 the output of which is provided to a comparator unit 212 where it is subtracted from the numbers provided by the square register 200. As long as the outputs of register 200 exceed the outputs of adder 208, enabling control signals are sent to an add command generator 214 which provides pulses to the controller 24 causing the X, Y and Z command pulses to be generated.

As had been previously noted in the preferred embodiment the controller operates on a DDA principle, and the outpus of the generator 214 constitute add commands causing the controller to add the contents of the three I registers into their respective R registers. At such time as the integral of the outputs of the adder 208 equals the integral of the outputs of the square register 200, a signal is sent to add command generator 214 by the comparator 212 terminating the generation of any add command pulses. In this manner, the add command generator provides output pulses until sufficient additional pulses are received by the square register 200 from line 60 to cause its outputs to exceed those of the adder 210. In this closed loop manner, an equality is maintained between the contents of the two registers insuring that the actual resultant motion is proceeding at the rate commanded by the adaptive controller.

At some point the square registers 200, 202, 204 and 206 will be filled to their capacity. When that condition is detected, these registers are all simultaneously cleared and the procedure starts over again. This clearing operation may introduce a minor error into the add commands, but this error can be made as small as possible by making the registers larger.

Figure 8:
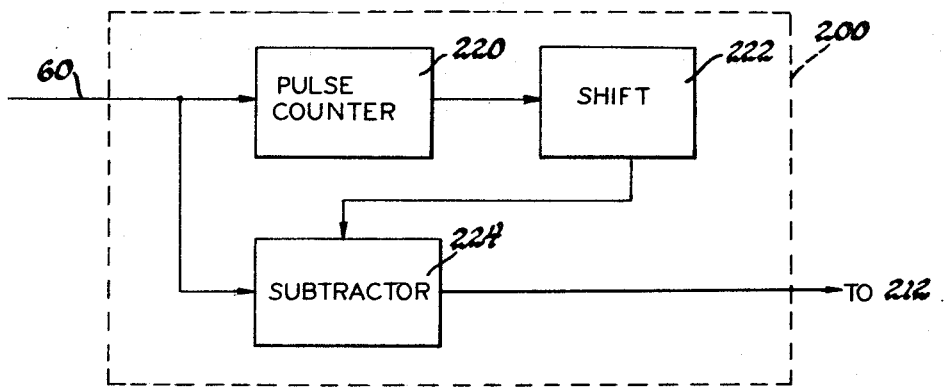
FIG. 8 is a block diagram of a square register which forms a part of the IPM logic.

The internal structure of the square register 200 which is identical to the square register 202, 204 and 206 is disclosed in FIG. 8. The pulses on line 60 are entered into a counter 220. Simultaneously, the contents of this counter, after the addition of each pulse, are shifted one binary position to the left by unit 222 (effectively multiplying the quantity contained in the pulse counter 220 by a facter of two) and a *one* is then subtracted from the shifted quantity by a subtractor 224. The *one* is the same pulse that was entered into the counter from line 60. The output of the subtractor constitutes a series of numbers which are provided to comparator 212. The integral of the numbers provided to comparator 212, after n pulses appear on line 60, will be equal to $n^2$. Effectively, this system adds the quantity $(2n-1)$ into the comparator 212 for each pulse received, wherein n is the count of that pulse. As shown below, the contents of the register 226 will have a value of $n^2$.

| $n$ (Counter 220) | $(2n-1)$ | $n^2$ |
| --- | --- | --- |

| 0 | | 0 |
|---|---|---|
| 1 | 1 | 0+1=1 |
| 2 | 3 | 1+3=4 |
| 3 | 5 | 4+5=9 |
| 4 | 7 | 9+7=16 |
| 5 | 9 | 16+9=25 |

The mathematical statement of the operation performed above is $$A = \sum_{n=1}^{n} (2n-1)$$

This is an arithmetic progression. Applying the formula for its sum we have $$\text{Sum} = \frac{\text{number of terms}}{2}(\text{first term} + \text{last term})$$

Here the first term = 1 and the last term = $2n-1$

Substituting: $A = \frac{n}{2}(1+2n-1) = n^2$

Figure 9:
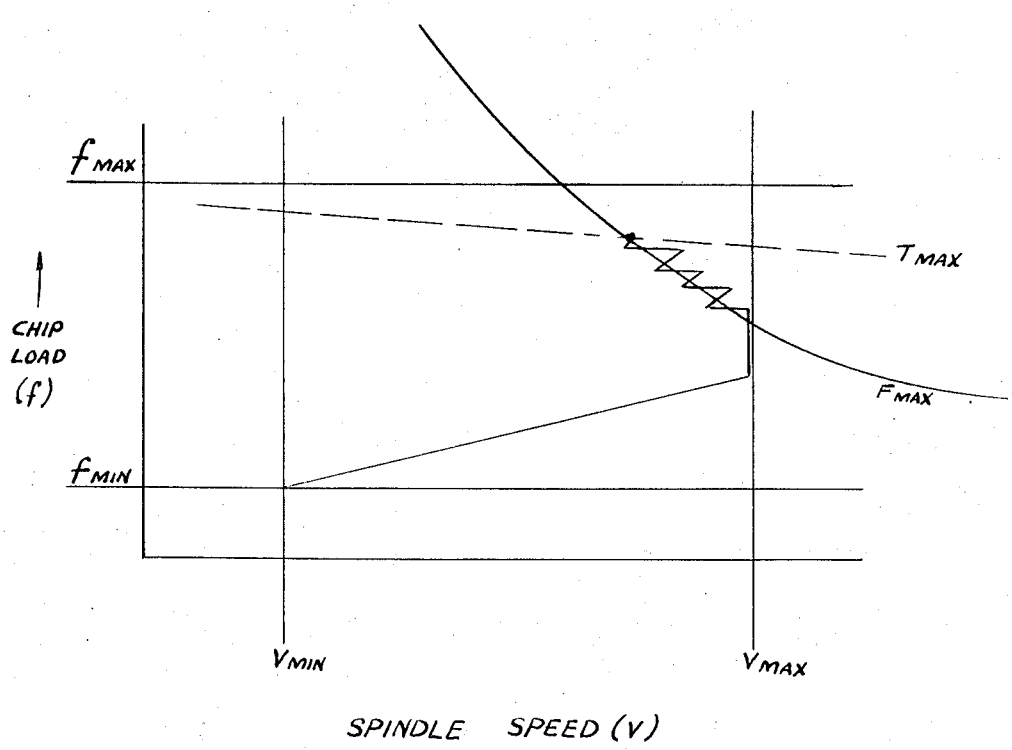
FIG. 9 is a graph illustrating the adaptive mode of operation of the system of the present invention.

FIG. 9 illustrates a typical mode of operation of the adaptive controller in optimizing machine tool operation. With spindle speed plotted as the abcissa and chip-load as the ordinate, the minimum and maximum values of spindle speed and chip-load bound an area in which machine operation may occur. Maximum torque extends somewhat parallel to maximum chip-load. It may either be above or below it depending upon several other factors. In FIG. 8 it is illustrated as the dotted line below F-Max, thus further limiting the range of operation of the system. F-Max, which varies as a function of both chip-load and spindle speed may also limit the area of machine operation.

As shown by the solid line in FIG. 8, beginning with the minimum values of spindle speed and chip-load which occur as soon as the cutter impacts the work, both chip-load and spindle speed are increased during each sampling period under percentage control initially. When the V-max. line is intersected spindle speed is no longer increased but chip-load is increased during each sampling period. When the F-Max. line is intersected both spindle speed and feedrate are decreased until the violation is corrected. Both values are then increased in a percentage manner. This results in a zig-zag movement along the F-Max. line until T-Max. is reached at which point the control continues to oscillate about that point.

Having thus described our invention, we claim:

1. In a control system for a machine tool having a cutter which interacts with a workpiece, in combination: sensors associated with the machine for measuring parameters relating to the interaction of the cutter with the workpiece and for generating signals representative of the values of these parameters; means for introducing signals representative of the numerical values of constraints relating to the desired operation of the machine; means for accepting said constraint values and said sensor values and for generating a pair of control signals for the machine tool, said last means including means for generating a pair of numerical values, means for deriving said control signals from said values, and means for modifying said values at spaced time intervals, at least one of said values being modified during an interval by a magnitude proportional to its value at the start of that interval.

2. The control system of claim 1 wherein said means for modifying sad values at spaced time intervals operates so that the direction of modification of said pair of numerical values during any time interval is dependent upon the relationship between the numerical values of the constraints related to the desired operation of the machine and the signals representing the actual operation of the machine including the sensor values, the direction of modification being such as to urge the machine toward operation in a mode which is within the constraints relating to the desired operation of the machine.

3. The control system of claim 1 wherein said means for modifying said values at spaced time intervals operates so that the process of modification of said numerical values which is being modified by a magnitude proportional to its value at the start of that time interval is terminated at such time as the actual operation of the machine violates the constraints relating to the desired operation of the machine.

4. The control system of claim 1 wherein the machine tool is a milling machine, the pair of control signals respectively control the rate of feed and rate of rotation of the machine cutter, one of the numerical values is representative of the rate of rotation of the machine cutter and the other numerical value is representative of the chip-load of the machine, and the control signal for the feed rate of the machine is derived by multiplying the numerical values.

5. The system of claim 1 wherein the numerical values are maintained in first registers and the means for modifying the values at spaced time intervals includes second registers each associated with one of said first registers, means for loading the values contained in first registers into their associated second registers prior to any modification, means for repeatedly recirculating the contents of each of the first and second registers, means for incrementing the first registers by a first fixed value during each recirculation; means for modifying the contents of each second register by a different factor during each recirculation, and means for terminating the modification process when the contents of the second registers achieve a predetermined value.

6. The system of claim 5 wherein said means for modifying the values at spaced time intervals operates so that the contents of the first registers are each modified by the minimum quantity storable in such register during each recirculation and the contents of the second registers are modified by subtracting a fixed value from their contents during each recirculation.

7. The system of claim 6 wherein each of the second registers has a different value subtracted from it during each recirculation so that they achieve the unique conditions at which their recirculation is terminated at different times.

8. The system of claim 5 wherein a third register is provided, one of said sensor values is initially loaded into said third register, said third register and one of said first registers are modified at rates proportional to their contents, and the contents of the third register are continually compared to one of the constraint values to terminate the modification process when the contents of the third register equal the constraint value.

9. In a control system for a machine tool having a cutter which interacts with a workpiece, in combination: sensors associated with the machine for measuring parameters relating to the interaction of the cutter with the workpiece and for generating signals representative of the values of these parameters; means for introducing signals representative of the numerical values of constraints relating to the desired operation of the machine; means for generating a pair of numerical values, means for deriving control signals for the machine from said values, and means for modifying said values at spaced time intervals, said last said means including a register, means for setting a numerical value representative of one of the measured parameters in the register prior to the modification of the numerical values, means for simultaneously modifying the quantity in the register and one of the numerical values at rates proportional to their contents at any given time, and means for comparing the contents of the register with one of the constraint values and for terminating the modification operation at such time as the contents of the register equal the numerical value of such restraint.

10. The system of claim 9 wherein said means for setting a numerical value in the register operates such that the numerical value which is set in the register prior to the modification of the numerical value is representative of torque and the contents of the register are compared to the constraint value which is representative of the maximum torque.

11. The system of claim 9 wherein during each interval each of the numerical values is modified by a fixed percentage of its original content unless the contents of the register exceed the constraint value against which it is compared during such modification process, in which event the modification of at least one of said numerical values is terminated.

12. The system of claim 9 wherein the means for simultaneously modifying the quantity in the register and one of the numerical values at rates proportional to their contents at any given time comprises a pair of remainder registers, one associated with said register and one associated with said numerical value, means for retaining the quantity in the register and the numerical value each into their associated remainder register, means for detecting overflows from said remainder registers, and means for modifying the quantity in said register or said numerical value at such time as an overflow occurs from its associated remainder register.

13. In a control system for a machine tool having a cutter which interacts with a workpiece, in combination: sensors associated with the machine for measuring parameters relating to the interaction of the cutter with a workpiece and for generating signals representative of the values of these parameters; means for introducing signals representative of the numerical values of constraints relating to the desired operation of the machine; means for accepting said constraint values and said sensor signals and for generating a pair of control signals for the machine tool, said last means including means for generating a pair of numerical values each of which is a function of one of the control signals, means for deriving the control signals from said values, means for modifying said values at spaced time intervals, and means for setting said numerical values to a first pair of said constraint values at such time as the sensor signals are in such a pattern as to indicate that the cutter is out of contact with the workpiece, and a second set of constraint values at such time as signals from the sensors are in such a pattern as to indicate that the cutter has initially made contact with the workpiece.

14. The control system of claim 13 wherein the values to which the numerical quantities are set when the sensor signals are in such a pattern as to indicate that the cutter is out of contact with the work piece are equal to the maximum feedrate and the minimum torque.

15. In a control system for a machine tool having a cutter which interacts with a workpiece, in combination: sensors associated with the machine for measuring parameters relating to the interaction of the cutter with the workpiece and for generating signals representative of the values of these parameters; means for introducing signals representative of the numerical values of constraints relating to the desired operation of the machine; means for generating a pair of numerical values; means for deriving a pair of control signals for the machine tool from said values, and means for modifying said numerical values at spaced time intervals, said last said numerical means including a pair of first registers containing said numerical values, a pair of second registers, one associated with each first register, means for loading the contents of the first registers into the second registers prior to the initiation of the modification; means for modifying said second registers each time a modification is made in said first registers, and means for terminating the modification process upon the occurrence of a unique condition in each of said second registers.

* * * * *